(12) United States Patent
Pérez Cortés

(10) Patent No.: US 10,989,526 B2
(45) Date of Patent: Apr. 27, 2021

(54) DEVICE FOR THE ACQUISITION AND RECONSTRUCTION OF OBJECTS BY VISUAL INSPECTION

(71) Applicant: INSTITUTO TECNOLÓGICO DE INFORMÁTICA, Valencia (ES)

(72) Inventor: Juan Carlos Pérez Cortés, Valencia (ES)

(73) Assignee: INSTITUTO TECHNOLÓGICO DE INFORMÁTICA UPV CIUDAD POLITÉCNICA DE LA INNOVACIÓN, Valencia (ES)

( * ) Notice: Subject to any disclaimer, the term of this patent is extended or adjusted under 35 U.S.C. 154(b) by 0 days.

(21) Appl. No.: 16/623,806

(22) PCT Filed: Jun. 20, 2018

(86) PCT No.: PCT/EP2018/066408
§ 371 (c)(1),
(2) Date: Dec. 18, 2019

(87) PCT Pub. No.: WO2018/234378
PCT Pub. Date: Dec. 27, 2018

(65) Prior Publication Data
US 2020/0208966 A1 Jul. 2, 2020

(30) Foreign Application Priority Data
Jun. 21, 2017 (EP) ..................................... 17382384

(51) Int. Cl.
*G01B 11/245* (2006.01)
*G01B 5/00* (2006.01)
(Continued)

(52) U.S. Cl.
CPC ............ *G01B 11/245* (2013.01); *B07C 5/366* (2013.01); *G01B 5/0004* (2013.01); *G06T 7/0004* (2013.01)

(58) Field of Classification Search
CPC combination set(s) only.
See application file for complete search history.

(56) References Cited

U.S. PATENT DOCUMENTS

| | | | |
|---|---|---|---|
| 6,061,126 A * | 5/2000 | Yoshimura | G01B 11/245 356/237.1 |
| 7,403,872 B1 | 7/2008 | St. Onge et al. | |

(Continued)

FOREIGN PATENT DOCUMENTS

| | | |
|---|---|---|
| EP | 2 511 653 A1 | 10/2010 |
| WO | 2005/022076 A2 | 3/2005 |
| WO | 2017096145 A1 | 6/2017 |

OTHER PUBLICATIONS

International Search Report and Written Opinion for PCT/EP2018/066408 dated Jul. 16, 2018.
(Continued)

*Primary Examiner* — Gordon J Stock, Jr.
(74) *Attorney, Agent, or Firm* — Thomas | Horstemeyer, LLP

(57) ABSTRACT

The present invention is a device for the complete acquisition of the shape of an object by means of a plurality of image sensors arranged around a space for image capture. Image sensors capture a plurality of images that are carried to a reconstruction system formed from said plurality of images corresponding to different views of the object. Document EP2511653 discloses a system where the object falls through the trap area so that there is no type of fastener or support which hides some part of the object. The present invention is a device for the acquisition and reconstruction of objects characterized by the use of an actuator serving as (Continued)

launcher and configured so that the object is positioned at the point of capture of images at either zero or very close to zero speed to improve the resolution of each image without blurring due to movement, even with relatively long exposure times. Additionally, the actuator is configured so that the fall of the object is such that it prevents damage by the impact effect.

18 Claims, 3 Drawing Sheets

(51) Int. Cl.
*G06T 7/00* (2017.01)
*B07C 5/36* (2006.01)

(56) References Cited

U.S. PATENT DOCUMENTS

| | | | | |
|---|---|---|---|---|
| 7,961,912 B2* | 6/2011 | Stevick | ............... | H04N 13/254 |
| | | | | 382/106 |
| 9,194,691 B2* | 11/2015 | Lane | ..................... | G01B 11/24 |
| 9,821,345 B2* | 11/2017 | Sterkel | ..................... | G01N 3/40 |
| 10,417,754 B2* | 9/2019 | Kimura | .................. | H04N 7/181 |
| 10,737,299 B2* | 8/2020 | Wagner | ............. | G05B 19/4183 |
| 2013/0051696 A1* | 2/2013 | Garrett | .................... | G01W 1/14 |
| | | | | 382/254 |

OTHER PUBLICATIONS

Extended European Search Report of the European 17382384.0-1568 dated Sep. 21, 2017.

* cited by examiner

DEVICE FOR THE ACQUISITION AND RECONSTRUCTION OF OBJECTS BY VISUAL INSPECTION

CROSS-REFERENCE TO RELATED APPLICATIONS

This application is the 35 U.S.C. § 371 national stage application of PCT Application No. PCT/EP2018/066408, filed Jun. 20, 2018, which claims priority to and the benefit of European Patent Application EP17382384.0 titled "DEVICE FOR THE ACQUISITION AND RECONSTRUCTION OF OBJECTS BY VISUAL INSPECTION" filed Jun. 21, 2017, the entire disclosures of which are incorporated herein by reference.

OBJECT OF THE INVENTION

The present invention is a device for the complete acquisition of the shape of an object by means of a plurality of image sensors arranged around a space of image capture.

Image sensors capture a plurality of images that are carried to a shape reconstruction system from said plurality of images corresponding to different views of the object. Document EP2511653 discloses a system where the object falls through the capture area so that there is no type of holder or support element that hides any part of the object.

The present invention is a device for the acquisition and reconstruction of objects characterized by the use of an actuator used as launcher and configured so that the object is positioned at the point of image capture at speed either zero or very close to zero to improve the resolution of each image without blurring due to motion, even with exposure times relatively long.

Additionally, the actuator is configured so that the fall of the object is such that it prevents damage by the effect of impact.

BACKGROUND OF THE INVENTION

The patent with EP2511653 publication number describes a device and method for acquisition and reconstruction of objects which makes use of a structure which supports and maintains a plurality of image sensors distributed in the space around a sphere.

The term image sensor should be interpreted in the following description as a device that is adapted to capture an image according to the axial direction wherein said sensor is oriented. This sensor can also have trigger and focusing means to establish given exposure times and depths of field.

The axes of the image sensors are oriented towards the center of the sphere. The sphere is a geometric locus useful for determining the position of the sensors, but it does not have to be physically represented by the support structure of the plurality of sensors. In fact, patent EP2511653 uses a polyhedral structure where the sensors are placed in the center of the faces being positioned on a sphere inscribed in the polyhedral volume.

According to the description of said patent EP2511653, the object on which the image capture has to be performed falls by gravity through an upper opening, through the interior volume, and exits through a lower opening. It is during the fall, in its passage through the interior volume, when the capture of the plurality of images that allow the reconstruction of the entire volume of the object is carried out, as there is no holder which supports the object so all the outer surface of the object is visually free and accessible by the plurality of image sensors.

In this patent, according to prior art, at the time of capturing the plurality of images, the object is describing a falling trajectory imposing a shutter speed sufficiently high and a diaphragm aperture also large so that the images are not blurred due to motion.

Raising the shutter speed is limited for the sensors and a large focal aperture results in a reduction in depth of field that limits the size of the object to be captured.

Another drawback of the device described in the prior art is that the processed object, after passing through the sphere, acquires a speed that may be too high to withstand the impact in the subsequent reception and may cause damage.

The present invention solves the identified problems by providing an actuable holder with impulsion means which allow placing the object at zero speed or very close to zero in the focus point of the image sensors, and such impulsion means are configured to receive the launched object minimizing the contact speed during reception to prevent damage to said object.

DESCRIPTION OF THE INVENTION

The present invention is a device for the acquisition and reconstruction of objects by visual inspection through a plurality of image sensors so that the acquisition of the shape of the object is complete, without occluding points or regions of the object due to holding or support.

To solve the problems identified in the description of prior art, the device for the acquisition and reconstruction of objects comprising:
  a plurality of image sensors adapted for image acquisition;
  a computational equipment for reconstruction of volumes from images captured by the plurality of sensors;
wherein
  the sensors are spatially distributed in positions of a sphere, with their optical axis oriented towards the inside of the sphere, preferably the center of the sphere;
  there is at least one access from the lower part of the sphere, according to the direction of gravity $\vec{g}$, for the input/output of the object to be inspected;

The image sensors are distributed around a sphere with their axes directed inward, preferably toward the center of the sphere. The point where the axes of the image sensors converge is contained within the depth of field of each of the image sensors.

When the object is released, the path is such that the object is placed either at the point of convergence of the axes of the image sensors or in nearby points. If the path is such that the object is slightly above the point of convergence of the axes of the image sensors then the object passes twice through said point of convergence and two captures may be obtained at the same height.

Terms such as vertical or horizontal, or other relative positions such as upper and lower, used throughout the description, should be interpreted with reference to the direction defined by the Gravity Vector $\vec{g}$.

According to one embodiment, the release of the object from the bottom of the sphere takes place from a first holder and reception is performed by means of a second holder. In this particular case the trajectory of the object is not completely vertical but corresponds to a parabolic trajectory with the ascending branch and descending branch nearly coincident. In this case, the maximum of this parabolic trajectory is the apogee either of the point where the axes of the image sensors converge or of a nearby point.

Since the image sensors have a certain visual field angle and a certain depth of field, for example dependent on the diaphragm aperture, the intersection of the volumes where the object is captured sharp that define each of the image sensors results in the capture volume of the object which shape has to be acquired.

When it is stated that the apogee should be at the point of convergence of the axes of the image sensors "or at nearby points", nearby points must be such that the object located at such nearby points is completely enclosed within the volume where all images are sharp.

The way in which the device according to the present invention forces the object to follow the proper trajectory, and avoids any damage when it falls is incorporating the following elements:
- one or more holders for the object to be inspected, displaceable in a longitudinal direction, placed under the access of the lower part of the sphere, with the longitudinal direction oriented towards that access;
- impulsion means for moving the at least one movable holder;
- a control unit in communication with the impulsion means adapted to set the movement of the at least one holder according to at least the following release steps:
  - upward acceleration of the holder to accelerate the object to be inspected laying on the holder,
  - deceleration of the ascent of the holder until reaching zero speed for separation between the object and the holder,
- and according to at least the following reception steps:
  - downward acceleration of the holder for receiving the falling object,
  - deceleration of the descent of the holder to reach zero speed; and,
  - wherein this control unit is in communication with the computer equipment and is adapted to establish at least one activation of the image capture of the object at a time instant between the instant of start of the ascent deceleration and the instant of start of the descent deceleration of said object.

As will be shown in the embodiments, the device comprises at least a holder for the object to be inspected movable in a longitudinal direction towards the interior of the sphere. In case that there are two holders, a first holder dedicated to the release and a second holder dedicated to the reception, then the longitudinal directions of one and another, although both oriented towards the interior of the sphere, are slightly convergent towards a point to establish a path from the first holder to the second holder as a parabola. That is, to allow the second holder to be capable of receiving the object launched by the first holder. If only one holder is used, the longitudinal direction is vertical so that the movement of the object is coincident with the holder, which is below it.

The at least one holder is movable along its longitudinal direction and is actuated by the impulsion means. The impulsion means are preferably a linear actuator controllable by the control unit that will determine the position at all times and as a result the speed and acceleration.

The control unit is configured to set a specific movement of the holder moved by the impulsion means so that, from a rest position in a lower position, a first stage of release is set, providing an acceleration that impulses the object and a subsequent deceleration that separates the object from the holder; and after a time long enough for the object to rise to the point or points where it is captured by the plurality of image sensors, a reception step comprising a downward acceleration to match the speed of the holder to the object and a deceleration that is transferred to the object, but without impact.

Depending on the ascent deceleration of the holder, the object is separated from the holder during said deceleration period of time, or at the end of the deceleration period of time. The same applies when the object is receptioned by the holder wherein the reception may occur at the start of the descent acceleration of the holder or during the period of time of the descent constant velocity of said holder.

Therefore, according to the invention, the activation of the image capture of the object is at a time instant when the object is separated from the holder.

According to an embodiment, the activation of the image capture of the object is at a time instant in a sub period of time between the instant of the end of the ascent deceleration of the at least one holder and the instant of start of the descent acceleration of the at least one holder.

According to these steps, a device is obtained that is able to place the object in the volume where the image sensors have the object within their visual field openings and within their depths of field. It is in this position where the device activates the image sensors for capturing the plurality of images and carries out the reconstruction of the object based on the images.

In the detailed examples of the invention, further elements which allow continuous feeding process objects for capture by a feed line and a line output of the captured objects will be described in greater detail.

DESCRIPTION OF THE DRAWINGS

These and other features and advantages of the invention will be more clearly apparent from the following detailed description of a preferred embodiment given purely as an illustrative and non-limiting example, with reference to the accompanying figures.

DETAILED DESCRIPTION OF THE INVENTION

Figure 1:
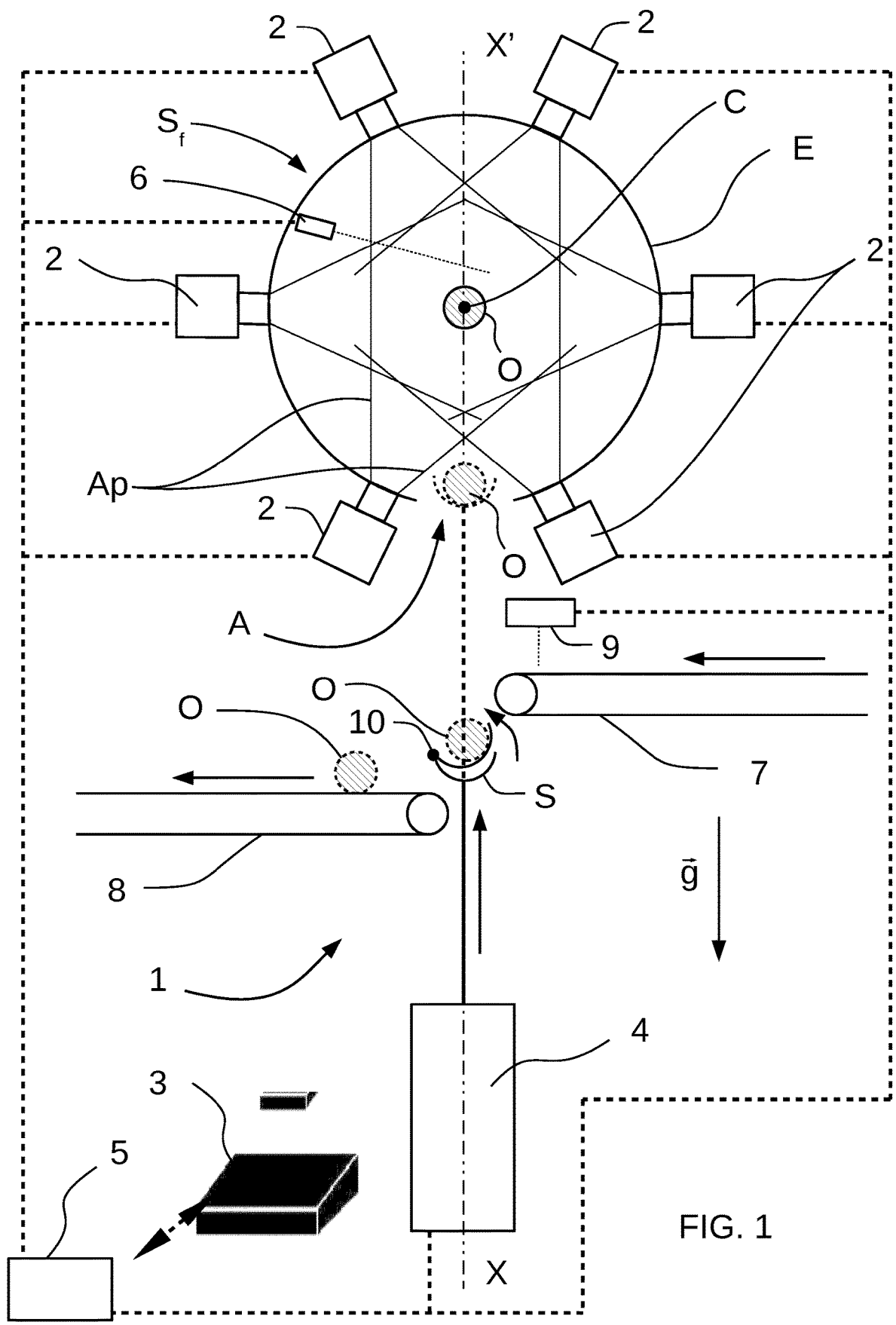
FIG. 1 This figure schematically shows an embodiment of the invention with a single holder and with input and output feed means of the captured objects.

FIG. 1 shows a schematic view of an embodiment of the invention formed by a device (1) for the acquisition and reconstruction of objects (O) by visual inspection where, on the same schematic representation, more than one position of the object (O) to be captured and of the moving parts are shown to explain their operation.

The device (1) comprises a plurality of sensors (2) distributed over a surface (Sf) of spherical configuration (E). This surface (Sf), in this embodiment, serves as support element of the plurality of sensors (2) allowing them to have their main axis oriented towards inside the surface (Sf). In particular, the axes (not shown graphically to avoid an excess of lines) are oriented towards the center (C) of the sphere (E). The plurality of sensors (2) provide multiple images of the same object (O) from different points of view covering the entire outer surface of the object (O) to capture.

Although the axes are not shown, two diverging straight lines representing the amplitude of the visual field of each of the image sensors (2) are depicted. The intersection of the conical volumes defined by the image sensors (2) is an internal volume where the simultaneous capture of the object (O) is performed by all the sensors (2).

The object (O) to capture not only must be located in this volume but the depth of field of each of the image sensors (2) should be enough to cover the visible part of the object (2).

In the graphical representation, it is shown at the bottom a holder (S) with a upward concave shape that can accommodate the object (O) to capture. This holder (S) is connected to impulsion means (4) which in this embodiment is formed by a linear actuator acting vertically moving a rod which at its upper end is attached to the holder (S).

The device (1) comprises a control unit (5) in communication with the linear actuator (4). The communication is represented by dashed line. Thus, the monitoring unit (5) sets the position of the holder (S) by sending commands to the linear actuator (4). The control unit (5) according to this embodiment determines, as a function of time, the position, velocity and acceleration of the holder (S).

A little later, a way to carry out this control by the control unit (5) will be described, especially by imposing movements to the holder (S) that are part of a launching step of the object and movements corresponding to a subsequent reception of the released object.

The thrown object (O) object rises and passes through a low opening (A) of the sphere (E) reaching the apogee in its upward motion in the capture volume, located either in the center (C) or in points near the center (C) of the sphere (E).

As shown in FIG. 1, the control unit (5) comprises a sensor (6) adapted to measure whether the object (O) launched by the holder (S) reaches a preset position within the sphere (E); and wherein the control unit (5) is further configured to determine the activation instant when the sensor (6) measures if the object has reached the preset position.

The control unit (5) measures the time that elapses from a time reference, knowing that the throwing motions have been performed. The control unit (5) is also in communication with each of the image sensors (2) activating the capture of multiple images at the time when the control unit (5) estimates the object (O) is either in the center (C) or in points near the center (C) of the sphere (E). At the apogee, the object velocity is zero and therefore the images are not blurred due to movement for a suitable rate of capture speed, always much less than the capture speed required for an object that is already in free fall and whose movement must "freeze".

The control unit (5) sends the images captured by the image sensors (2) to a computer equipment (3), which may be any of those known in the prior art to combine the multiple images of the object (O) captured from different directions to reproduce the entire volume.

Since the object has been photographed suspended in air, there is no holder that prevents visual access from the image sensors (2) to the object (O) or any part of it.

Figure 2:
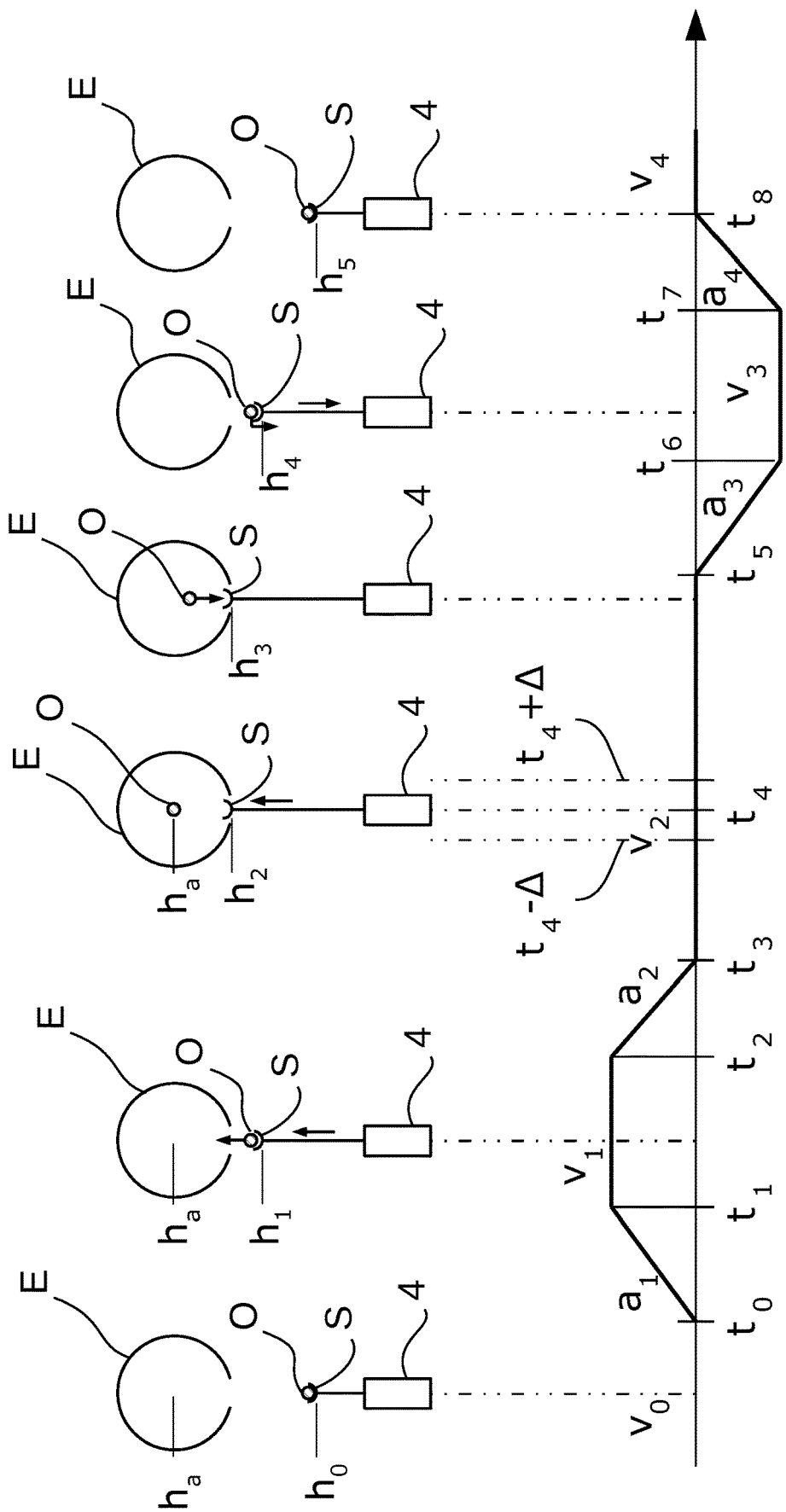
FIG. 2 In this figure, the velocities and accelerations of the holder are schematically shown in time, linking these variables to the positions of the device and of the object that is captured by the image sensors.
Figure 3:
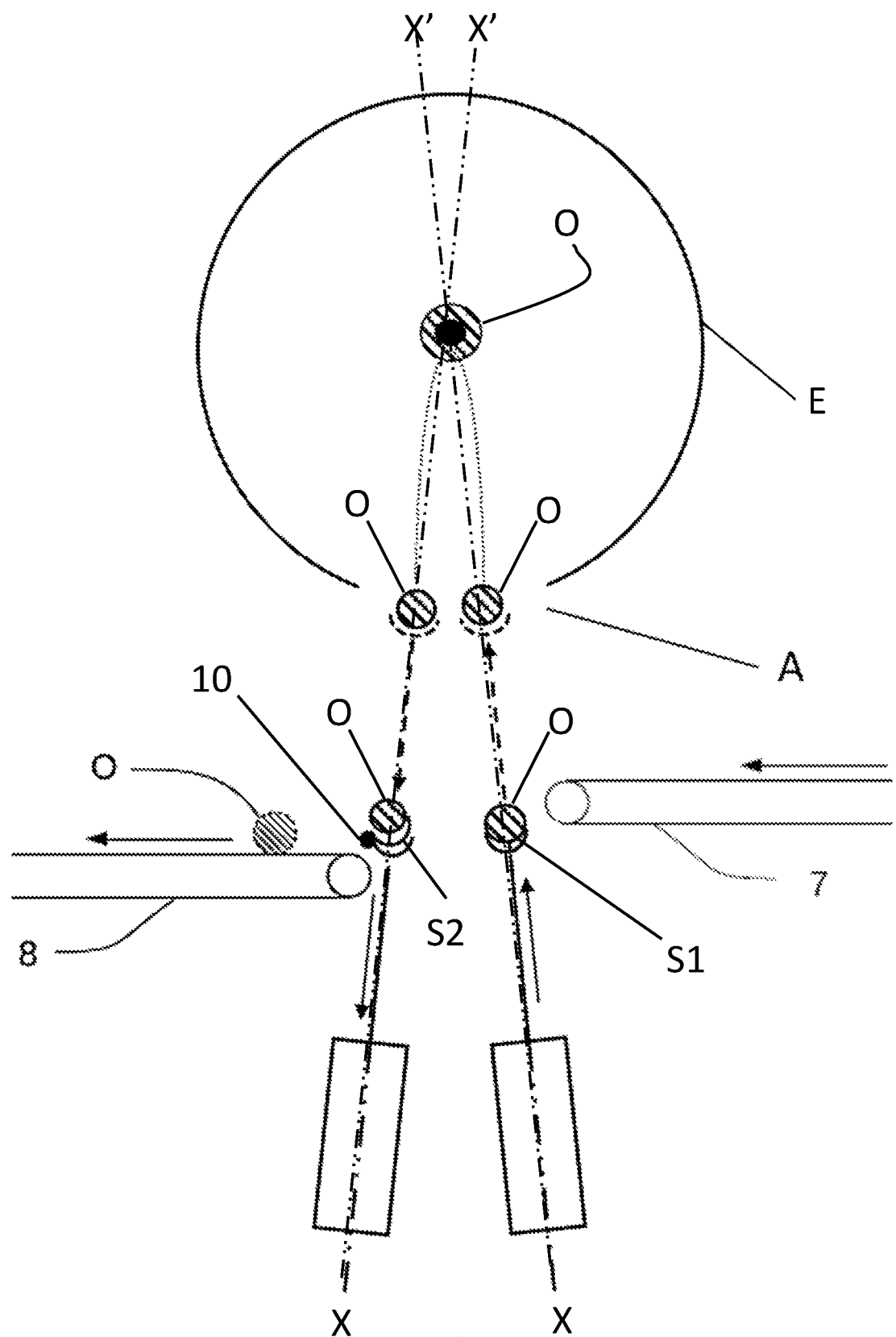
FIG. 3 This figure schematically shows an embodiment of the invention having a launching holder and a receiving holder.

The object launching and reception processes to solve the referred problems, is described with the help of FIG. 2.

FIG. 2 shows a timeline whose initial reference $t_0$ considers that the object to be captured (O) is already placed on the holder (S) and it (S) is in a lower position ($h_0$).

On the same timeline, the object (O), the sphere (E), the holder (S) at the position corresponding to the instant indicated by the timeline, and the impulsion means acting on the holder (S) are represented very schematically.

In this initial rest position until reference $t_0$, the holder velocity is zero $v_0=0$. The release process is a step having a first time interval up to $t_1$ with positive acceleration $a_1$ imposing an impulsion that transmits acceleration from the holder (S) to the object (O).

This acceleration increases the speed of the holder (S) to a speed $v_1$ which corresponds to the release speed of the object (O). This speed $v_1$ is the one that the object (O) must acquire so that, in its ascent, its apogee (identified as $h_a$) is at the center (C) of the sphere (E) or at a point near said center (C), understood by near that the object (O) at the time of the capture of the plurality of images is within the volume wherein the plurality of image sensors (2) are focusing, its speed being zero or near zero such that the sensors (2) adequately capture (in angle of view and focus) the totality of said object (O).

FIG. 2 shows an instant of the ascent in the position of the holder (S) where its height is ($h_1$) with a constant ascent speed.

Reached the moment identified as $t_2$, the impulsion means (4) cause a deceleration $a_2$ (negative acceleration) to the holder (S) causing a decrease in speed until the holder is stopped (speed $v_2=0$ at instant $t_3$) reaching the holder (S) a maximum height ($h_2$).

During the deceleration phase, the object (O) is not able to follow the holder (S) and separates from it, following its own ascent until it reaches the apogee at time $t_4$.

According to one embodiment the apogee may be positioned slightly above the center (C) of the sphere (E) therefore the object will pass twice through said center (C) at a reduced speed. Thus, the control unit (5) has at least two launching possibilities with the object (O) at a speed close to zero and therefore in good conditions for capture. FIG. 2 shows two time instants in which the object passes through the center (C) of the sphere (E), the instant $t_4-\Delta$ and the instant $t_4+\Delta$ being $2\Delta$ the space of time between the two capture instants of the plurality of images.

After the image capture, the object starts its free fall by gravity ($\vec{g}'$) approaching the holder (S) in a uniformly accelerated motion. To avoid the impact in the fall, the holder starts at an instant $t_5$ a downward motion with negative acceleration $a_3$ up to an instant $t_6$ approaching the speed of descent of the holder (S) to the fall speed of the object (O). The holder (S), after reaching a certain speed $v_3$ at instant $t_6$ maintains this constant speed until an instant of time $t_7$. The instant of collection of the object (O) with minimal impact, when the height of the object (O) is the same as the height $h_4$ of the holder (S), may occur either during the interval of negative acceleration of the holder (S) between the time instants $t_5$ and $t_6$, or during the constant speed interval of the holder (S) between time instants $t_6$ and $t_7$.

Once the time instant reached $t_7$ with the object (O) laying on the holder (S), a positive acceleration $a_4$ starts to reduce the speed of descent of the holder (S) until it is stopped (speed $v_4=0$) from time instant $t_8$ recovering a height $h_5=h_0$, the height in its lower position that the holder (S) had at the start of the release process.

While this is an embodiment, it is possible to establish shorter release and collection processes, for example reducing or even eliminating the time intervals where the speed $v_1$ and $v_3$ are constant.

It is also possible the use of two holders (S) arranged so that they are nearly parallel, with their axes oriented towards the opening (A) such that the launching step is performed by the first holder (S), and the collecting step is performed by the second holder (S). The launch trajectory should be such that the apogee is in the center (C) of the sphere (E) or close to it as described, and the branch descent trajectory matches the second holder (S). An embodiment arranges the holders (S) substantially vertical with a slight tilt such that their longitudinal directions X-X' converge at a point located above the center (C) of the area (E).

In this case, a holder (S) is for launch and the other holder (S) is for reception. When there is only a holder(S), the same holder is for launch and reception.

If two holders (S) are present, the launch holder (S) recovers the initial position after the upward accelerated and upward decelerated movements to proceed with the next launch. Conversely, after collection by the receiving holder (5), it (S) recovers its upper position to receive again another object (O).

Returning to FIG. 1, additional elements are described that allow the device, for instance, to capture multiple objects (O) in a sequential manner.

According to one embodiment, combinable with any of the ones described above, the objects (O) to capture are fed by an input or feeding conveyor (7). A sensor (9) detects the object (O) arrival verifying by means of the control unit (5) that the holder (S) is free. If so, the object (O) is deposited on the release holder (S) and, if not, the control unit (5) stops the input conveyor (7) until the release holder (S) release is free to allow new objects (O) for their capture.

Once the object (O) has been captured according to any of the embodiments described, a rocker (10) located on the collecting holder (S) transfers the object (O) to an output conveyor (8) leaving the holder (S) free.

The invention claimed is:

1. Device (1) for the acquisition and reconstruction of objects (O) by visual inspection, comprising:
    a plurality of image sensors (2) adapted for image acquisition;
    a computational equipment (3) for reconstruction of volumes from images captured by the plurality of sensors (2) wherein the sensors (2) are spatially distributed in positions of a sphere (E) having a lower part according to the direction of gravity ($\vec{g}$), with their optical axis oriented towards the inside of the sphere;
    at least one access (A) disposed in the lower part of the sphere (E) for the input/output of an object (O) to be inspected;
    at least one holder (S) for the object to be inspected, movable in a longitudinal direction X-X', located under the access (A) of the lower part of the sphere (E), with the longitudinal direction X-X'oriented towards said access (A);
    impulsion means (4) for moving the at least one holder (S);
    a control unit (5) in communication with the impulsion means (4) adapted to establish the movement of the at least one holder (S) according to at least the following launching steps:
        upward acceleration of the at least one holder (S) for accelerating an object (O) to be inspected laying on the holder (S),
        deceleration of the ascent of the at least one holder (S) until reaching zero speed for separation between the object (O) and the holder (S),
    and, according to at least the following reception steps:
        downward acceleration of the at least one holder (S) for the reception during the fall of the object (O),
        deceleration of the descent of the holder (S) to reach zero speed; and,
    wherein the control unit (5) is in communication with the computer equipment (3) and is adapted to establish at least one activation of the image capture of the object (O) at a time instant between the instant ($t_3$) of the end of the ascent deceleration of the at least one holder (S) and the instant ($t_5$) of start of the descent acceleration of the at least one holder (S).

2. Device (1) according to claim 1, wherein the longitudinal direction X-X' of movement of the at least one holder is vertical.

3. Device (1) according to claim 1 wherein the longitudinal direction X-X' of movement of the at least one holder passes through the center of the sphere (C).

4. Device (1) according to claim 1, wherein the optical axes of the sensors (2) are oriented either towards the center of the sphere (C) or to a point inside the sphere through which the trajectory of the object (O) launched by the at least one holder (S) passes.

5. Device (1) according to claim 1, wherein the control unit (5) is adapted to determine the upward acceleration that provides the upward thrust to the object (O) to be inspected and which can position said object (O) at the center of the sphere (E).

6. Device (1) according to claim 1, wherein the control unit (5) is adapted to determine the upward acceleration that provides the upward thrust to the object (O) to be inspected and which can position said object (O) and at the center of the sphere (E).

7. Device (1) according to claim 1, wherein the control unit (5) is adapted for activating image capture at least at the moment when the object (O) reaches the apogee of the trajectory of the object (O) released by the at least one holder (S) at the point to where the axes of the optical sensors (2) are oriented inside the sphere (E).

8. Device (1) according to claim 1, wherein the control unit (5) is adapted for activating image capture in at least one of the two instants at which the object (O) reaches the point towards which the optical axes of the sensors (2) are oriented inside of the sphere (E), being these instants respectively before and after the instant of pass through the apogee located above that point.

9. Device (1) according to claim 1, wherein the sphere (E) has at least one opening (A) positioned for the access of the object (O) and the at least one holder (S).

10. Device (1) according to claim 1, wherein the control unit (5) is configured to determine the activation time of image capture by establishing the instant at which the object (O) reaches the point of image capture as a function of the movement of the at least one holder (S) launching the object (O).

11. Device (1) according to claim 1 wherein the control unit (5) comprises a sensor (6) adapted to measure whether the object (O) launched by the holder (S) reaches a preset position (P) within the sphere (E); and wherein the control unit (5) is further configured to determine the activation instant when the sensor (6) measures if the object has reached a preset position.

12. Device (1) according to claim 1, comprising a feeding conveyor (7) for carrying objects (O) to be inspected a holder (S) configured to launch the object into the sphere (E).

13. Device (1) according to claim 1, comprising an output conveyor (8) for evacuating the objects (O) that have been inspected from a reception holder (S), and wherein the reception holder (S) comprises an actuator (10) for transferring the inspected object (O) to the output conveyor (8).

14. Device (1) according to claim 1, wherein said device (1) is adapted to capture continuously a plurality of objects (O) fed through the feeding conveyor (7) and with evacuation through the output conveyor (8); and wherein the device (1) comprises a sensor (9) for detecting whether an object (O) reaches the at least one holder (S) in communication with the control unit (5) such that the control unit (5) is adapted so that upon detection of an object (O) that reaches the at least one holder (S) the launching steps of the object (O) and the image capture are followed; and subsequently to image capture and reception on the at least one holder (S), it activates the actuator (10) for transferring the inspected object (O) to the output conveyor (8).

15. Device (1) according to claim 1, wherein the sensors (2) are spatially distributed in positions of the sphere (E) with their optical axes oriented towards the center of the sphere (C).

16. Device (1) according to claim 1, wherein:
either the same holder (S) is intended to carry out the release and reception of the object (O),
or a first holder ($S_1$) is intended to carry out the launch and a second holder ($S_2$) is intended to carry out the reception.

17. Device (1) according to claim 16, wherein the device comprises a single holder (S) that is disposed relative to the sphere (E) to both launch and receive the object (O).

18. Device (1) according to claim 16, wherein the device comprises a first holder (S1) that is disposed relative to the sphere (E) to launch the object (O) and a second holder disposed relative to the sphere (E) to receive the object (O).

* * * * *